United States Patent

[11] 3,593,805

| [72] | Inventor | Willy Rau |
| | | Kirchheim (Teck), Germany |
| [21] | Appl. No. | 727,958 |
| [22] | Filed | May 9, 1968 |
| [45] | Patented | July 20, 1971 |
| [73] | Assignee | Maschinenfabrik Rau OHG |
| | | Kirchheim (Teck), Germany |

[54] CARRIER BEAM UNIT FOR AGRICULTURAL IMPLEMENTS
14 Claims, 8 Drawing Figs.

[52] U.S. Cl............................ 172/776,
171/143, 172/456, 172/662
[51] Int. Cl............................ A01b 15/14
[50] Field of Search......................... 172/776,
630, 568, 662, 311, 640, 613, 456, 452, 459;
171/143, 46

[56] References Cited
UNITED STATES PATENTS

| 3,102,598 | 9/1963 | Mighell............... | 172/568 |
| 3,118,507 | 1/1964 | Oehler et al......... | 172/662 |
| 3,123,153 | 3/1964 | Morkoski et al..... | 172/640 |
| 3,250,333 | 5/1966 | Day..................... | 172/126 |
| 3,362,484 | 1/1968 | Walberg............... | 172/568 |

Primary Examiner—Robert E. Pulfrey
Assistant Examiner—C. Coughenour
Attorney—Michael S. Striker ABSTRACT: A carrier beam for carrying and loading agricultural implements and having a great length extending transverse to the direction of travel of a tractor to which it is connected is divided into several parts which are rigidly connected to each other in the working position so as to have a maximum working length and the outer parts of which may be pivoted toward each other to reduce this length at least to a size not exceeding the maximum width of a vehicle permitted to travel on a public road.

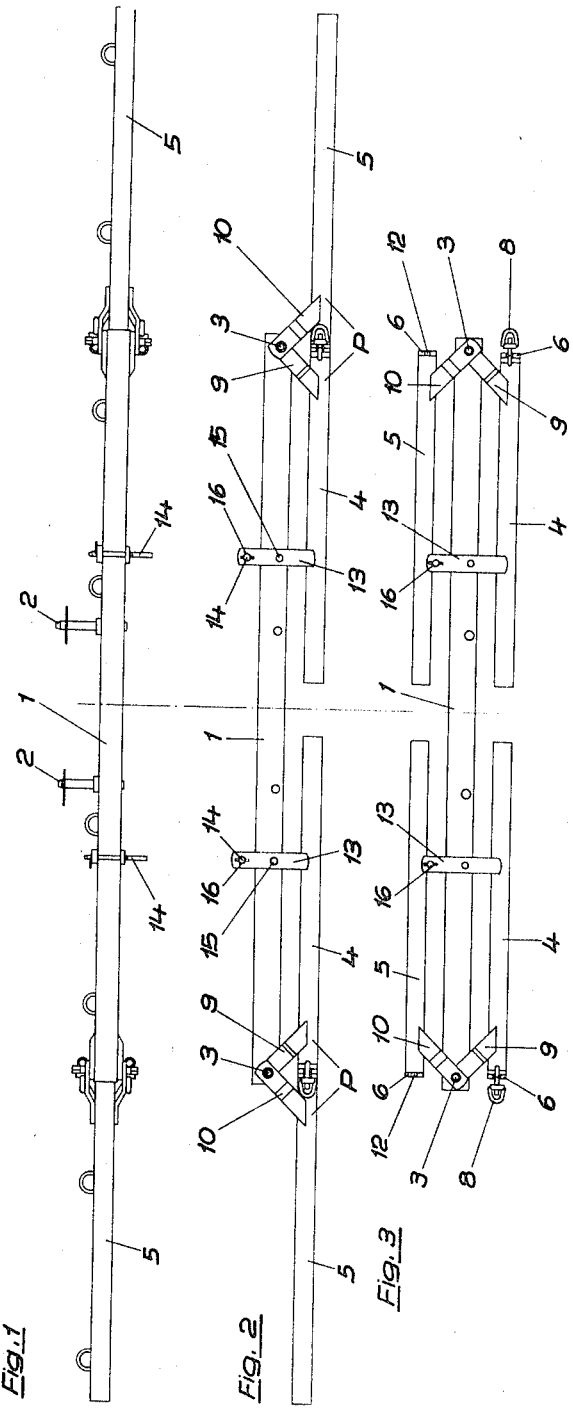

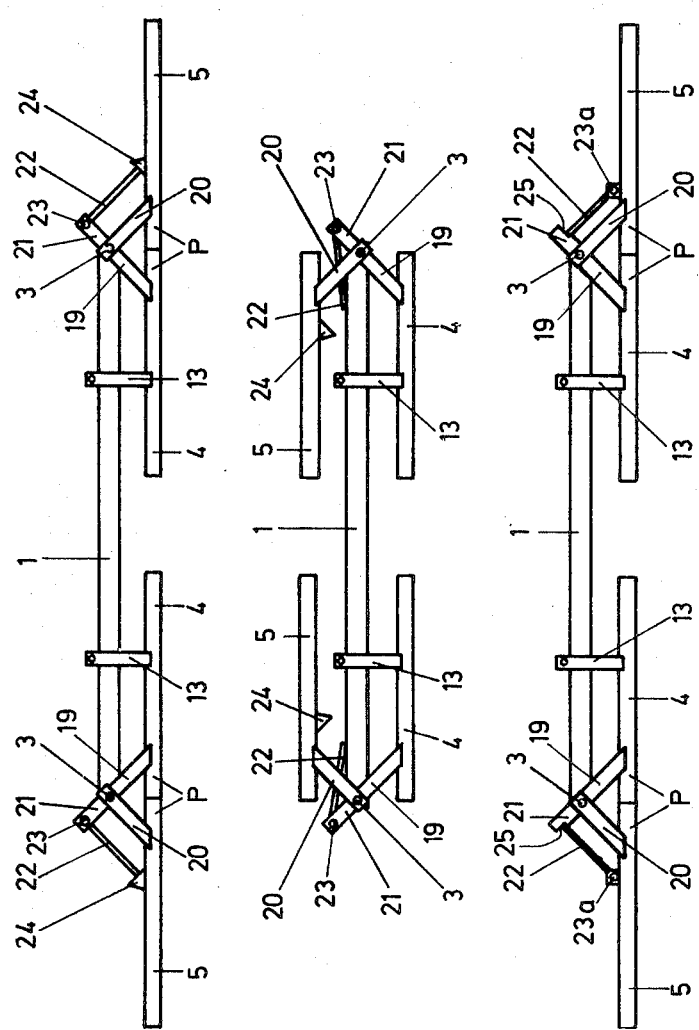

CARRIER BEAM UNIT FOR AGRICULTURAL IMPLEMENTS

The present invention relates to a carrier beam unit for connecting agricultural implements to a tool carrier frame of a tractor. Such a carrier beam unit when connected to a tractor extends transverse to the direction of travel of the tractor and approximately parallel to the surface of the ground, and it may be employed not only for supporting the implements, for example, harrows or crumbling rollers but also for exerting a load thereon, especially when a chain or combination of tools or implements which contribute to a common result are arranged behind each other. Such a combination which is frequently employed consists, for example, of duckfoot harrows or spring-tooth harrows which are followed by rotary roller crumblers.

Such a carrier beam unit is usually designed so as to be easily connected to and removed from the tool carrier frame which, in turn, may be easily connected to or removed from the free ends of a three-point linkage of the tractor and may be raised and lowered by the hydraulic lift of the three-point linkage to different positions which preferably include a "floating position."

For transporting such combinations of implements on public roads, the laws require them and thus also the supporting and pressure beams to be limited to a certain maximum width of, for example, 3 m. On the other hand, for agricultural purposes it is the modern trend to develop and employ more and more heavy and powerful tractors which also permit the use of agricultural implements and their elements such as, for example, supporting and pressure beams to be of a greater total effective width. This development led to the construction of supporting and pressure beams in the form of structural units consisting of a plurality of individual parts. The ends of these units were designed to be extended for work on the field or to be contracted for traveling on roads either by being pulled outwardly or pushed inwardly or be being pivoted outwardly or inwardly, and to be locked in either position.

It is an object of the present invention to provide a carrier beam unit of the general type as described above which is especially suitable for receiving unequally loaded agricultural implements. Such unequal loads occur, for example, when the implements which are to be loaded when the hydraulic lift of the tractor is in its floating position, for example, four harrows or four roller crumblers in a chain behind each other, adapt themselves to the uneven level of the ground which previously often led to irregular results in the direction of the width of the strip of ground worked upon, for example, when preparing seed beds.

It is another object of the invention to provide such a carrier beam unit which is of a construction as simple as possible, operates successfully also under varying working conditions, may be employed for working simultaneously on a strip of ground of a great width, and also complies with the legal requirements as to its maximum width when being transported on public roads.

A further object of the invention consists in designing such a carrier beam unit so as to be operated very easily at all times and especially to be easily changed over manually from its working position to its transporting or road position or vice versa.

Accordingly, it is an important feature of the invention that the carrier beam unit comprises a central beam which may be connected to the intermediate tool carrier frame which is directly or indirectly associated with the tractor, and a pair of swing beams which are pivotably connected to the ends of the central beam and each of which consists of two beam parts the outer part of which, as seen from the center of the central beam, may be placed substantially in alignment with the inner beam part or may be pivoted upwardly and then inwardly to its transporting position.

Since the two swing beams are pivotable independently of each other, for example, within limited angular distances, each of them may rest with a substantially uniform pressure on the associated implements since the number of the latter per each pair of swing beams amounts only to one half of the number of implements on a rigid continuous carrier beam or to a fraction of this number if more than two swing beams are employed, wherein one of the swing beams, for example, a central beam, is not divided.

These as well as additional objects, features and advantages of the present invention will become further apparent from the following detailed description thereof which is to be read with reference to the accompanying drawings, in which FIG. 1 shows a top view of a carrier beam unit according to a first embodiment of the invention in its extended working position;

FIG. 2 shows a side view of the carrier beam unit according to FIG. 1, as seen in the direction of travel of the tractor;

FIG. 3 shows a similar side view of the carrier beam unit, but in the collapsed position for traveling on a road;

FIG. 6 shows a side view similar to FIG. 2 of a carrier beam unit according to a second embodiment of the invention in its extended working position;

FIG. 7 shows a side view similar to FIG. 6, but in the collapsed or road position of the carrier beam unit; while FIG. 8 shows a modification of the carrier beam construction according to FIG. 6.

Figure 4:
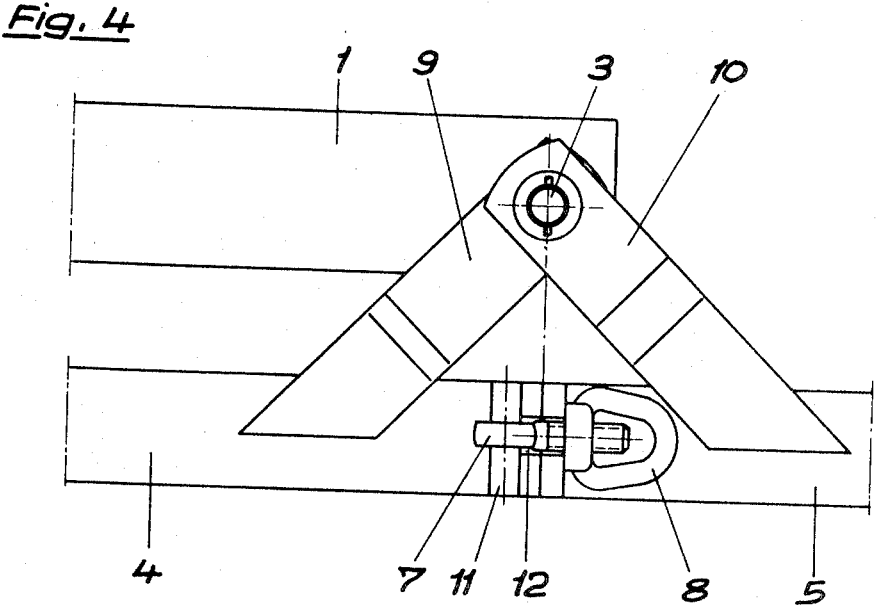
FIG. 4 shows an enlarged detail view of one of the articulated joints as shown in FIG. 2.
Figure 5:
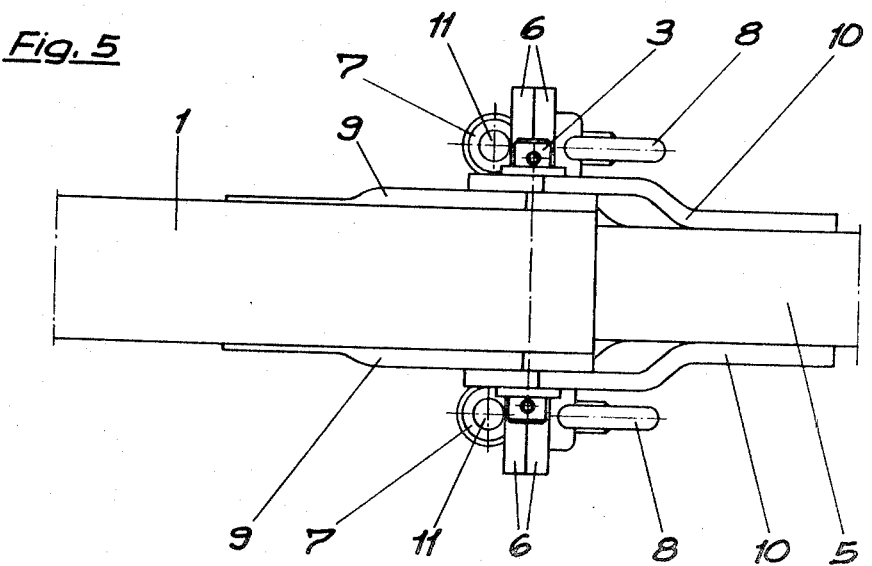
FIG. 5 shows a top view of FIG. 4.

According to the first embodiment of the invention as illustrated in FIGS. 1 to 5, the central or first beam 1 is provided with two plug elements 2 which permit this beam to be easily connected to and locked on a tool carrier frame (not shown) which, in turn, is connected to the tractor either directly or indirectly, especially by means of a conventional three-point linkage with a hydraulic lift. Each end of the central beam 1 is provided with a horizontal transverse bore through which a hinge pin 3 is inserted on which a swing beam P is pivotably mounted which consists of an inner beam part 4 (as seen from the center of the central beam 1) and an outer beam part 5. These two beam parts 4 and 5 on each end of the central beam 1 may be bolted to each other so as to form a rigid unit, i.e. the swing beam P, by means of flanges 6 on the adjacent ends of the two beam parts 4 and 5 and by pivotable screws 7 and ring-shaped nuts 8. For this purpose a pin 11 which serves as a pivot for the screw 7 and may for example, be U-shaped or hook-shaped is secured to the inner beam part 4, and the ring-shaped end of screw 7 is pivotable on pin 11, while each of the flanges 6 is provided with a slot 12 into which the shank part of the respective screw 7 may be inserted.

Near the flanges 6, a pair of hinge straps 9 is secured to the opposite sides of each inner beam part 4 and a pair of hinge straps 10 to the opposite sides of each outer beam part 5. The free ends of hinge straps 10 engage over the free ends of hinge straps 9 and both pairs of straps are provided with bores through which the hinge pin 3 extends. Thus, when not connected by the screws 7, both beam parts 4 and 5 of each swing beam P are pivotable independently of each other within a vertical plane about the horizontal axis of hinge pin 3 and when connected to each other by the screws 7, they are pivotable together as a rigid unit P about this axis.

Therefore, if the nuts 8 are loosened so far on screws 7 that the latter may be pivoted out of the slots 12 in flanges 6, the outer beam parts 5 of swing beams P may be pivoted upwardly and around the axis of hinge pins 3 until due to their own weight they rest securely on the upper side of the central beam 1. If when being pivoted upwardly the outer beam parts 5 already engage sooner upon the implement connecting element (not shown), they may be secured by conventional means, for example, by chains or plug connections, from falling back downwardly, provided they are not already held in a fixed position by their own weight and the resulting torque about the hinge pins 3.

The inner beam part 4 of each swing beam P is provided with a bifurcated strap 13 which is welded thereon and the arms of which engage upon the opposite sides of the central beam 1, while their outer ends are provided with bores 16 which are in alignment with each other and through which pins or plugs 14 may be inserted which limit the distance within which the swing beams P are pivotable about the hinge pins 3 and which preferably are prevented by suitable means from falling out of these bores.

These straps 13 may be further provided with another pair of aligned bores 15, and the pins 14 may be inserted through these bores and also through an associated bore of the same size in the central beam 1 so that the swing beams P will then not be pivotable about the hinge pins 3 but be rigidly connected to the central beam 1. This may in some cases be advisable, for example, when the two beam parts 4 and 5 of the swing beam P are of an unequal length or the implements are unsymmetrically suspended thereon.

The means for connecting the agricultural implements to the beam parts 4 and 5 of each swing beam P may be of any suitable type and may consist, for example, of simple eyes for easily connecting and disconnecting the supporting chains of harrows or roller crumblers.

When the beam parts 4 and 5 of each swing beam P are to be changed from the road position according to FIG. 3 to the working position according to FIG. 2 or vice versa, it is always necessary to manipulate the screws and nuts 7 and 8. Since this may sometimes be regarded as too bothersome, the invention further provides very simple means which require only a simple manipulation for securing the pivotable beam parts 4 and 5 in the working position or for disconnecting them from each other so as to permit the outer beam parts 5 to be pivoted over to the road position.

Two preferred embodiments of such a modified construction are illustrated in FIGS. 6 to 8 in which those parts which are of substantially the same shape and serve for the same purpose as in the embodiment according to FIGS. 1 to 5 are designated by the same reference numerals and do not need to be again specifically described.

Similarly as in the first embodiment of the invention as illustrated in FIG. 1 to 5, the two pairs of inner and outer beam parts 4 and 5 according to FIGS. 6 to 8 are provided with arms 19 and 20 for pivotably connecting both parts of each pair by means of a single hinge pin 3 to the respective end of the central beam 1 so as to be pivotable individually or together as a rigid unit about the axis of this pin 3. Since the two pairs of arms 19 and 20 of each swing beam P are welded to the beam parts 4 and 5 so as to extend at such an angle relative to each other that, when the beam parts are aligned in a horizontal position, the bores for receiving the hinge pin 3 are located vertically above the adjacent end surfaces of both beam parts and these end surfaces will be in direct and firm contact with each other under the gravity of the beam parts.

Both pairs of arms 19 are extended beyond the hinge pins 3, and the free end of each extension 21 of the embodiment according to FIGS. 6 and 7 carries a pawl 22 which is pivotably connected thereto at 23. These pawls 22 are made of such a length that their free ends may be applied at a certain angle upon the outer beam parts 5 so as to brace the latter and thereby to prevent the two inner beam parts 4 of the swing beam P from separating from the two outer beam parts 5. For additional security pawls 22 preferably engage upon suitable abutments 24 which are welded upon the outer beam parts 5 and may in addition be provided with recesses for receiving the ends of pawls 22.

FIG. 6 shows the carrier beam unit in its working position, while FIG. 7 shows it in its transporting or road position in which the pawls 22 are disconnected from the abutments 24 and pivoted over upwardly so that subsequently also the outer beam parts 5 may be pivoted over upwardly so as to rest directly or indirectly on the upper side of the central beam 1.

The further embodiment of the invention as illustrated in FIG. 8 is similar to that as shown in FIGS. 6 and 7, except for the fact that the pawls 22 are not pivotably connected to the extensions 21 of arms 19 but at 23a to the outer beam parts 5 and abut in the working position of the swing beam P against the extensions 21 of the arms 19 which for this purpose may be provided with recesses 25.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A carrier beam unit for connecting agricultural implements to a tool carrier frame of a tractor comprising a first beam having opposite ends and being adapted to be connected to the tool carrier frame extending in a substantially horizontal plane and transversely to the direction of movement of the tractor; two swing beams, each comprising an inner beam part and an outer beam part; two pivot means for pivotally connecting each of the two beam parts of one of said two swing beams individually to one of the opposite ends of said first beam and each of the two beam parts of the other of the two swing beams individually to the other of said opposite ends movable from a working position in which the two beam parts of each swing beam extend longitudinally substantially aligned with each other substantially in the direction of said first beam tiltable with respect thereto with the inner part of each swing beam projecting inwardly from the respective end of said first beam and the outer part of each swing beam projecting outwardly from the respective end, and a second position in which said outer part of each swing beam is pivoted through an angle of at least 90° about the pivot axis of the respective pivot means; and means for locking said two beam parts of each swing beam to each other in said working position.

2. A carrier beam unit as defined in claim 1, further comprising means for locking said outer beam parts in said second position to which they are pivoted from said working position around said axis of said pivot means.

3. A carrier beam unit as defined in claim 1, wherein said outer beam parts are pivotable from said first to said second position and vice versa at an angle of about 180° around said axis of said pivot means, and further comprising means for supporting said outer beam parts in said second position on said first beam.

4. A carrier beam unit as defined in claim 1, further comprising means for locking said inner beam parts in said first position to said first beam.

5. A carrier beam unit as defined in claim 1, further comprising means on said first beam for laterally guiding said swing beams and for limiting the extent of the pivoting movement thereof.

6. A carrier beam unit as defined in claim 1, further comprising a pair of guide straps secured to each inner beam part and engaging upon the opposite sides of said first beam and adapted to guide one of said swing beams within a vertical plane relative to said first beam, and means on said guide straps for limiting the extent of the pivoting movement of said inner beam parts relative to said first beam.

7. A carrier beam unit as defined in claim 6, wherein said means for limiting the extent of the pivoting movement of said inner beam parts are formed by bores in said guide straps and by pins inserted into said bores and cooperating with said first beam for limiting the extent of the pivoting movement of said inner beam parts relative to said first beam.

8. A carrier beam unit as defined in claim 1, wherein adjacent ends of the two parts of each swing beam abut against each other when said swing beams are in said working position, and wherein the pivot axes of said pivot means are arranged in such a manner to permit upward pivoting of said outer part through said angle to said second position.

9. A carrier beam unit as defined in claim 8 wherein said first beam and said swing beams are located within a substantially common plane and said swing beams in said working position are located below said central beam, said pivot means having axes extending at right angles to said common plane.

10. A carrier beam unit as defined in claim 8, wherein said beam parts of each swing beam are provided near their adjacent ends with upwardly projecting arms, both of said arms being pivotably connected by said pivot means to said first beam, said beam parts having such a size that in said working position their adjacent end surfaces abut on each other in a manner so as to support each other and form a substantially rigid unit.

11. A carrier beam unit as defined in claim 10, wherein at least the free ends of said arms of said two beam parts are inclined toward each other, said pivot means connecting said arms to the ends of said first beam so as to be pivotable about a common axis located above the abutting end surfaces of said beam parts when said swing beams are in said working position.

12. A carrier beam unit as defined in claim 10, wherein the ends of said beam parts facing each other are provided with flanges forming said abutting end surfaces supporting each other in said working position, each of said flanges having a slot extending substantially in the longitudinal direction of said beam parts and in alignment with the slot in the adjacent flange, said locking means comprising a screw and a nut thereon, and means for pivotably connecting said screw to one of said beam parts so as to be pivotable into said slots when said nut is loosened, whereupon said nut may be tightened to secure said beam parts rigidly to each other.

13. A carrier beam unit as defined in claim 8, wherein said locking means comprise a pawl member between said two beam parts of each swing beam, means for pivotably connecting said pawl member to one of said beam parts, and means for bracing said pawl member on the other beam part when said swing beam is in said working position.

14. A carrier beam unit as defined in claim 13, wherein said beam parts of each swing beam are provided near their adjacent ends with arms which are upwardly inclined in opposite directions and are pivotably connected by said pivot means to said first beam at their point of intersection, the arm on one of said beam parts extending beyond said pivot means, said pawl member being adapted to be braced between said extension and the other beam part.